United States Patent
Aburmad et al.

(10) Patent No.: US 9,851,541 B2
(45) Date of Patent: Dec. 26, 2017

(54) ENHANCING A FOG PENETRATION CAPABILITY OF AN INFRARED OPTICAL SYSTEM

(71) Applicant: OPGAL OPTRONIC INDUSTRIES LTD., Karmiel (IL)

(72) Inventors: Shimon Aburmad, Nahariya (IL); Ernest Grimberg, Kiriat Bialik (IL)

(73) Assignee: OPGAL Optronic Industries Ltd., Karmiel (IL)

( * ) Notice: Subject to any disclaimer, the term of this patent is extended or adjusted under 35 U.S.C. 154(b) by 0 days.

(21) Appl. No.: 14/762,815

(22) PCT Filed: Jan. 21, 2014

(86) PCT No.: PCT/IL2014/050068
§ 371 (c)(1),
(2) Date: Jul. 23, 2015

(87) PCT Pub. No.: WO2014/115138
PCT Pub. Date: Jul. 31, 2014

(65) Prior Publication Data
US 2015/0355439 A1 Dec. 10, 2015

(30) Foreign Application Priority Data

Jan. 23, 2013 (IL) .......................... 224379

(51) Int. Cl.
*G01J 1/04* (2006.01)
*G02B 13/14* (2006.01)
(Continued)

(52) U.S. Cl.
CPC .......... *G02B 13/146* (2013.01); *B64D 43/00* (2013.01); *G01J 1/0411* (2013.01); *G01J 1/42* (2013.01); *G02B 1/00* (2013.01); *G08G 5/025* (2013.01)

(58) Field of Classification Search
CPC ......... G01J 1/0411; G01J 1/42; G02B 13/146; G02B 1/00; B64D 43/00
See application file for complete search history.

(56) References Cited

U.S. PATENT DOCUMENTS 4,431,917 A * 2/1984 Gibbons ............ G02B 17/0808
250/332
6,208,459 B1 3/2001 Coon et al.
(Continued)

FOREIGN PATENT DOCUMENTS

CN 101097262 1/2008
CN 201041588 3/2008
(Continued)

OTHER PUBLICATIONS

Janos Technology Inc. (http://janosprimary.com/templates/pdf/Reference.pdf) Tanya, Jun. 14, 2001.
(Continued)

*Primary Examiner* — Christine Sung
(74) *Attorney, Agent, or Firm* — Pearl Cohen Zedek Latzer Baratz LLP

(57) ABSTRACT

An infrared optical system having a spectral range for achieving a fog penetration distance of at least 2.75 Runway Visibility Range (RVR) is provided herein. The optical system may include a single set of optical elements designed to have a wavelength range extending beyond 1.2 μm toward shorter wavelengths and comprising a short-wavelength infrared (SWIR) range and at least one of: a middle-wavelength infrared (MWIR) range and a long-wavelength infrared (LWIR) range, to enhance a detection range of the infrared optical system, wherein the single set of optical elements is laid such that the both the SWIR range and the at least one of the MWIR range and the LWIR range of infrared radiation pass through all of the optical elements.

7 Claims, 5 Drawing Sheets

(51) Int. Cl.
    *G01J 1/42*         (2006.01)
    *B64D 43/00*     (2006.01)
    *G02B 1/00*      (2006.01)
    *G08G 5/02*      (2006.01)

(56) References Cited

U.S. PATENT DOCUMENTS

| | | |
|---|---|---|
| 8,339,600 B2 | 12/2012 | Chrisp |
| 2008/0225409 A1 | 9/2008 | Alexay |
| 2011/0051229 A1 | 3/2011 | Alexay |
| 2012/0002202 A1* | 1/2012 | Chrisp ................. G01J 3/0208 356/328 |
| 2012/0007979 A1 | 1/2012 | Schneider et al. |
| 2013/0221206 A1* | 8/2013 | Crowther ................. G01J 1/00 250/216 |

FOREIGN PATENT DOCUMENTS

| | | |
|---|---|---|
| CN | 201383012 | 1/2010 |
| WO | WO 2012/066431 | 5/2012 |

OTHER PUBLICATIONS

International Search Report of PCT Application No. PCT/IL2014/050068 dated May 15, 2014.
Sparrold Scott et al: "Refractive lens design for simultaneous SWIR and LWIR imaging", Infrared Technology and Applications, vol. 8012, No. 1, May 13, 2011, pp. 1-18.
R L Sinclair et al: "Broadband Lens Design for SWIR/MWJR Applications", Infrared Technology and Applications, Aug. 13, 1997, pp. 376-386.
Supplementary European Search Report of EP Application No. dated Aug. 8, 2016.

* cited by examiner

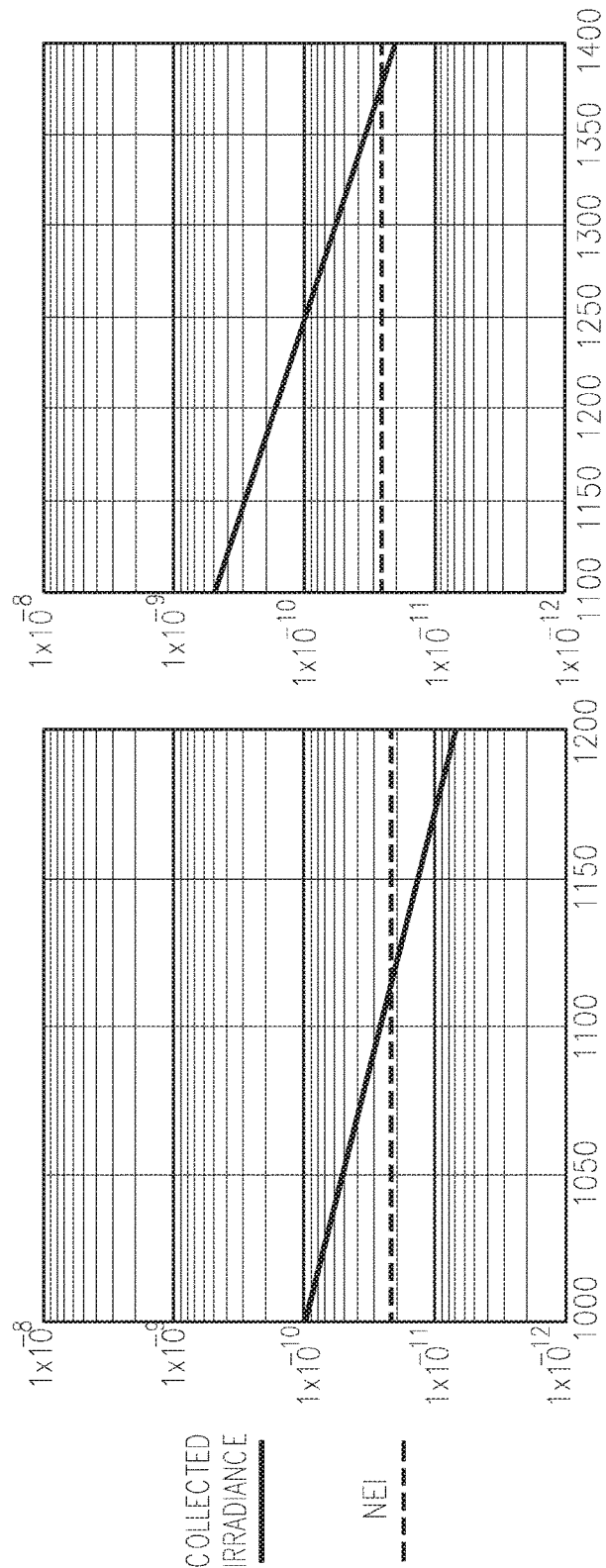

VISIBILITY RANGE 423m

VISIBILITY RANGE 500m

ENHANCING A FOG PENETRATION CAPABILITY OF AN INFRARED OPTICAL SYSTEM

CROSS-REFERENCE TO RELATED APPLICATIONS

This application is a National Phase Application of PCT International Patent Application No. PCT/IL2014/050068, International Filing Date Jan. 21, 2014, entitled: "ENHANCING A FOG PENETRATION CAPABILITY OF AN INFRARED OPTICAL SYSTEM", published on Jul. 31, 2014 as International Patent Application Publication No. WO 2014/115138, claiming priority of Israel Patent Application No. 224379, filed Jan. 23, 2013, both of which are incorporated herein by reference in their entireties.

TECHNICAL FIELD

The present invention relates to the field of infrared imaging systems, and more particularly, to imaging and light sources detection by a wide band camera.

BACKGROUND OF THE INVENTION

Current aircraft enhanced visual systems (EVS) are designed to provide improved orientation during day and night taxiing or flying, and to enable visual landing in bad atmospheric conditions such as fog, haze, dust, or smog. For example, such system may display a captured video image superimposed on the pilot field of view. During a regular landing approach, the plane descends at an angle of 3 degrees. At the decision height (DH), which is approximately 200 feet above ground, the pilot has to recognize the structure of the lights in the runway. If, at the DH, the pilot is not able to recognize the runway light structure, he has to make a missed approach. Assuming a descending angle of 3 degrees and a decision height of 200 feet, the distance between the plane to the lights structure is about 1165 meters.

The atmospheric transmittance for landing applications is defined by a value called the runway visibility range (RVR). One (1.0) RVR is the maximum distance for runway light detection by the naked eye. The mathematical meaning of this definition is that RVR is defined as the distance at which the light intensity drops to 2% contrast from the contrast value at zero distance. The contrast value at zero distance is one (1.0). For each additional RVR distance, the runway bulb signal decreases by a factor of 50. Current systems have a maximal penetration distance of 2.2*RVR. The atmospheric attenuation, in the visible spectral band and in the near IR, for a distance of 2.2 RVRs, is equal to $50^{2.2}$, which is approximately 5500. In order to penetrate such a large atmospheric attenuation, current systems provide a signal-to-noise ratio (SNR) of about 5500 at zero distance. In other words, the EVS camera should provide a signal-to-noise ratio of 5500 in laboratory conditions. In order to obtain the required SNR, the minimum number of photoelectrons to be collected per pixel per frame is 30,000,000 (or $3\times10^7$). However, the quantum noise is not the only source of noise. In order to overcome the additional noise sources such as the readout noise, the fixed pattern noise, etc., the minimum number of photoelectrons to be collected per pixel per frame have to exceed $30*10^6$. The SNR requirement is a necessary but not sufficient condition.

In most airports, the runway lights are mounted on short poles above ground level. The bulbs are exposed to wind and rain; therefore the bulbs' temperature difference against the background is very low. The bulb's exterior material is glass. Glass is opaque above 2.2 microns. The conclusion is that in bad atmospheric conditions, the only spectra available for bulb detection are in the visible or near IR spectral bands. Current systems use spectral band ranges between 1.2 and 5.0 microns that are within the transmittance range of silicon and are optimal for the InSb focal plane array detectors.

SUMMARY OF THE INVENTION

One embodiment of the present invention provides an infrared optical system, characterized in that optics thereof are re-designed to be devoid of silicon, to have a wavelength range extending beyond 1.2 μm toward shorter wavelengths and comprising a short-wavelength infrared (SWIR) range and at least one of: a middle-wavelength infrared (MWIR) range and a long-wavelength infrared (LWIR) range, to enhance a detection range of the infrared optical system.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 4A-4D present comparative simulation results between a prior art system (FIG. 4A) and the infrared optical system of the invention (FIGS. 4B-4D), according to some embodiments of the invention.

DETAILED DESCRIPTION

Figure 1:
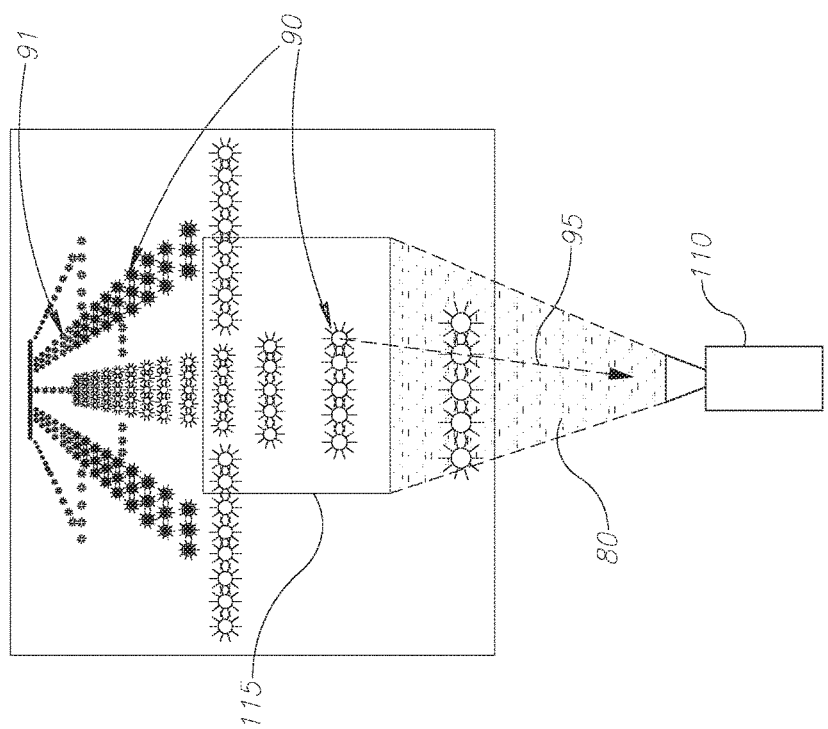
FIG. 1 is a high level schematic block diagram of an infrared optical system for detection of known light sources, according to some embodiments of the invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram of an infrared optical system 110 for detection of known light sources 90, according to some embodiments of the invention Infrared optical system 110 has an increased range, e.g. having an increased fog penetration capability. In the illustrated example, light sources 90 are runway lights of a landing area 91. Infrared optical system 110 acquires an image 115 of the scene by capturing light 95 emitted thereof and passing through fog 80 on its way to optics 120 (see FIG. 2) of system 110. System 110 is designed to have an increased spectral range, starting from a specified wavelength that is shorter than a transmittance threshold of silicon. Silicon has a transmittance larger than 50% in the range of ca. 1.2-6 µm. At shorter wavelengths, the transmittance of silicon deteriorates rapidly down to less than 5% at 1.1 µm.

In embodiments, infrared optical system 110 is characterized in that optics 120 thereof are re-designed to be devoid of silicon, to have a wavelength range extending beyond 1.2 µm toward shorter wavelengths and comprising a short-wavelength infrared (SWIR) range and at least one of: a middle-wavelength infrared (MWIR) range and a long-wavelength infrared (LWIR) range, to enhance a range thereof. Infrared optical system 110 hence operates in at least two of the infrared spectral ranges in which the atmosphere is transparent (near infrared and SWIR ranging ca. 0.7-2.5 µm, MWIR ranging 3-5 µm and LWIR ca. 8-14 µm).

Extending the spectral range at SWIR together with including MWIR and/or LWIR yield an extended detection range and a longer fog penetration distance, as well as a higher sun energy input which provides better detection of terrain features other than light sources 90. At night, SWIR may be particularly helpful in identifying light sources 90 while using MWIR further enhances the identification as well as provides details on the surroundings of light sources 90. Using a single set of optics 120 for both ranges (SWIR and MWIR/LWIR) dismisses with the need to carry out image fusion from detectors using different optics, as in the prior art.

Optics 120 are re-designed to be thermally and optically stable of over the extended wavelength range. For example, the enhanced range may be achieved by designing optics 120 to stably transmit radiation over a wide wavelength range of approximately 1-5 µm or by designing optics 120 to enable imaging at two distinct ranges (e.g. 1-2.3 µm and 8-13 µm) and then apply image fusion algorithms to the captured images. In embodiments, system 110 is arranged to perform multi-spectral and hyper-spectral imaging for various purposes.

The enhanced range may be utilized for various applications such as extending the detection range thereof or widening a range of substances that may be detected by system 110. Additional applications may include mining and geology (e.g. identify various minerals), food safety and quality inspection, Forensics (e.g. counterfeit detection, document verification), life science and biotechnology, medical and pharmaceutical science (e.g. drug discovery), military and defense, border protection, reconnaissance and surveillance, spectral tagging, targeting, security and surveillance, environmental monitoring, pollution detection, forestry management, precision agriculture and mineral exploration.

In embodiments, infrared optical system 110 is arranged to enhance visibility under atmospheric attenuation and is characterized in that it is arranged, by re-designing optics 120 to be devoid of silicon, to have a wavelength range extending beyond 1.2 µm toward shorter wavelengths, to achieve a fog penetration distance larger than 2.2 Runway Visibility Range (RVR). A detector or detectors of system 110 are correspondingly arranged to detect radiation at the extended bandwidth range.

For example, the increased spectral range of infrared optical system 110 may reach down to 1 µm (e.g. between 1.0 and 1.2 µm or even below 1.0 µm) to enhance its fog penetration capability measured by units of Runway Visibility Range (RVR) to at least 2.75.

As mentioned above, prior art systems have a fog penetration capability of 2.2 RVR's. The inventors have discovered that the presently disclosed system 110, having an improved spectral band optimization has a dramatically better fog penetration capability of 2.75 RVR's. The improved penetration distance is obtained by extending the lower spectral band from the start wavelength of 1.2 microns, to 1.0 microns (or to a wavelength below the spectral range of silicon, e.g. between 1.0 and 1.2 µm). Accordingly, system 110 may comprise an external window devoid of silicon.

However, as silicon, which is generally of extreme importance to the infrared industry and is used extensively as the material of choice for lens manufacturing, limits the lower spectral band starting wavelength. The silicon material has to be replaced by some other material that is transparent in the entire spectral band from 1.0 micron till 5 microns, like: Barium fluoride ($BaF_2$), cesium iodide (CsI), cadmium telluride (CdTe), calcium fluoride ($CaF_2$), lithium fluoride (LiF), zinc sulfide (ZnS, e.g. CLEARTRANS™ from Dow chemicals), sapphire or various chalcogenide compositions (e.g. various compositions of germanium (Ge), arsenic (As), selenium (Se) and antimony (Sb) such as SCHOTT's IG6 ($As_2Se_3$)). In some embodiments, the optics may be operative in parts of the band 1-5 microns, for example one system 110 might transmit in the spectral band from 1.0 till 2.3 microns, blocking the spectral band 2.3 till 3.3 microns, and transmitting from 3.3 till 5 microns.

In embodiments, infrared optical system 110 may further comprise at least two detectors having different spectral bands, of which one detector is at a spectral band starting at 1 µm. For example, system 110 may comprise an InGaAs detector for the band beginning at 1 µm (e.g. for a range 1.0-1.8 µm) and another detector (e.g. an InSb detector or an uncooled bolometric detector) for a higher band (e.g. 3.3-5.0 µm and 8.0-14.0 µm respectively, for market available detectors).

In embodiments, infrared optical system 110 may comprise a detector in a range comprising 1.0-2.3 µm. In embodiments, infrared optical system 110 may comprise a detector in a range comprising 3-5 µm and/or 8-12 µm.

Figure 2:
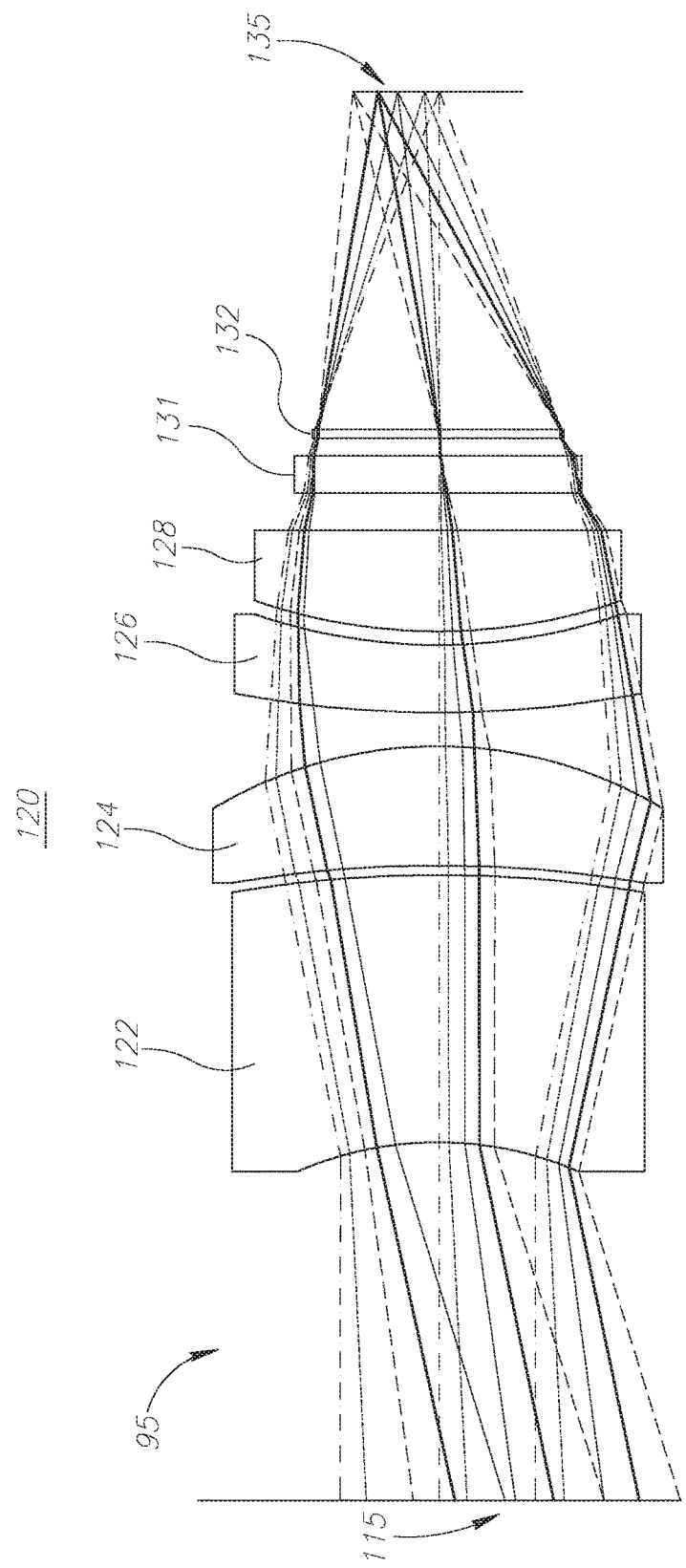
FIG. 2 is a high level schematic diagram of optics of the infrared optical system, according to some embodiments of the invention.

FIG. 2 is a high level schematic diagram of optics 120 of infrared optical system 110, according to some embodiments of the invention. Optics set 120 may be arranged to transfer to a detector 135 a spectral range starting from a specified wavelength that is shorter than a transmittance threshold of silicon while comprising a short-wavelength infrared (SWIR) range and at least one of: a middle-wavelength infrared (MWIR) range and a long-wavelength infrared (LWIR) range. Optics set 120 may be arranged, when incorporated in infrared optical system 110, to extend a range thereof, e.g. to have an increased fog penetration capability.

Optics set 120 may include in the illustrated example four elements 122, 124, 126, 128, as well as the dewar's window 131 and the detector's cold filter 132 that are made of at least one of: Barium fluoride, cesium iodide, cadmium telluride, calcium fluoride, lithium fluoride (LiF), zinc sulfide (ZnS, e.g. CLEARTRANS™ from Dow chemicals), sapphire or various chalcogenide compositions (e.g. various compositions of germanium (Ge), arsenic (As), selenium (Se) and antimony (Sb) such as SCHOTT's IG6 ($As_2Se_3$)), and are devoid of silicon, which would have limited the spectral range to be above 1.2 μm and the RVR to 2.2, as explained below. Optics set 120 is designed to have a spectral range starting from a specified wavelength that is shorter than a transmittance threshold of silicon, e.g. 1 μm or even lower.

In the non-limiting example illustrated in FIG. 2, lens 122 is made of SCHOTT's IG6 ($As_2Se_3$), lenses 124 and 128 are made of CLEARTRANS™ (ZnS), lens 126 is made of lithium fluoride (LiF) and dewar's window 131 and cold filter 132 are made of sapphire.

In general, the materials for optical elements 122, 124, 126 and 128 are selected to achieve a balanced and stable optical set 120 with respect to temperature and wavelength range.

In embodiments, optics set 120 may be configured to enable detection in a range comprising 1.0-2.3 μm. In embodiments, optics set 120 may be configured to enable detection in a range comprising 3-5 μm and/or 8-12 μm.

Figure 3:
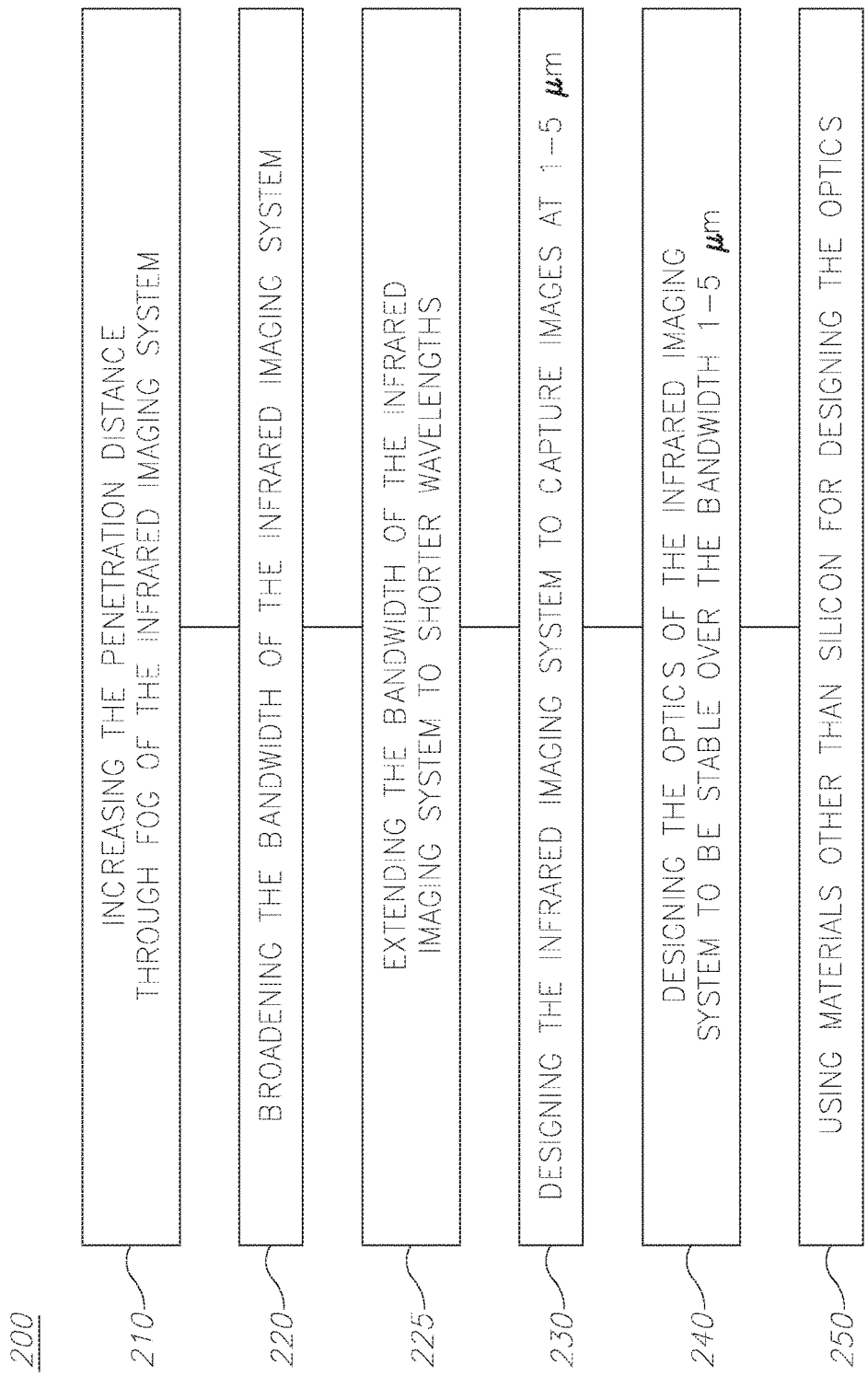
FIG. 3 is a high level flowchart illustrating a method of increasing a range of an infrared optical system, according to some embodiments of the invention.

FIG. 3 is a high level flowchart illustrating a method 200 of increasing a range of an infrared optical system, according to some embodiments of the invention. For example, method 200 may comprise enhancing a fog penetration capability of the infrared optical system (stage 210).

Method 200 comprises broadening a spectral range of the infrared optical system (stage 220) to shorter wavelengths (stage 225), e.g. shorter than a transmittance threshold of silicon such as to start at least from 1.0 μm while comprising a short-wavelength infrared (SWIR) range and at least one of: a middle-wavelength infrared (MWIR) range and a long-wavelength infrared (LWIR) range, by re-designing optics of the infrared optical system (stage 230) to be devoid of silicon, to yield a penetration distance larger than 2.2 Runway Visibility Range (RVR), for example by replacing silicon (stage 250) with at least one of: Barium fluoride, cesium iodide, cadmium telluride, calcium fluoride, lithium fluoride (LiF), zinc sulfide (ZnS, e.g. CLEARTRANS™ from Dow chemicals), sapphire or various chalcogenide compositions (e.g. various compositions of germanium (Ge), arsenic (As), selenium (Se) and antimony (Sb) such as SCHOTT's IG6 made of arsenic triselenide ($As_2Se_3$)), to yield a penetration distance of at least 2.75 Runway Visibility Range (RVR). In embodiments, method 200 comprises replacing silicon in the optics with at least one of: lithium fluoride, zinc sulfide and arsenic triselenide, and may further comprise making a dewar's window and a detector's cold filter of sapphire. Furthermore, method 200 comprises designing the optics to be stable over the extended bandwidth (e.g. 1-5 μm or parts thereof) with respect to temperature and wavelength range (stage 240).

In embodiments, method 200 may further comprise detecting in a range comprising 1.0-2.3 μm and optionally detecting in a range comprising 3-5 μm and/or 8-12 μm.

Figures 4C, 4D:
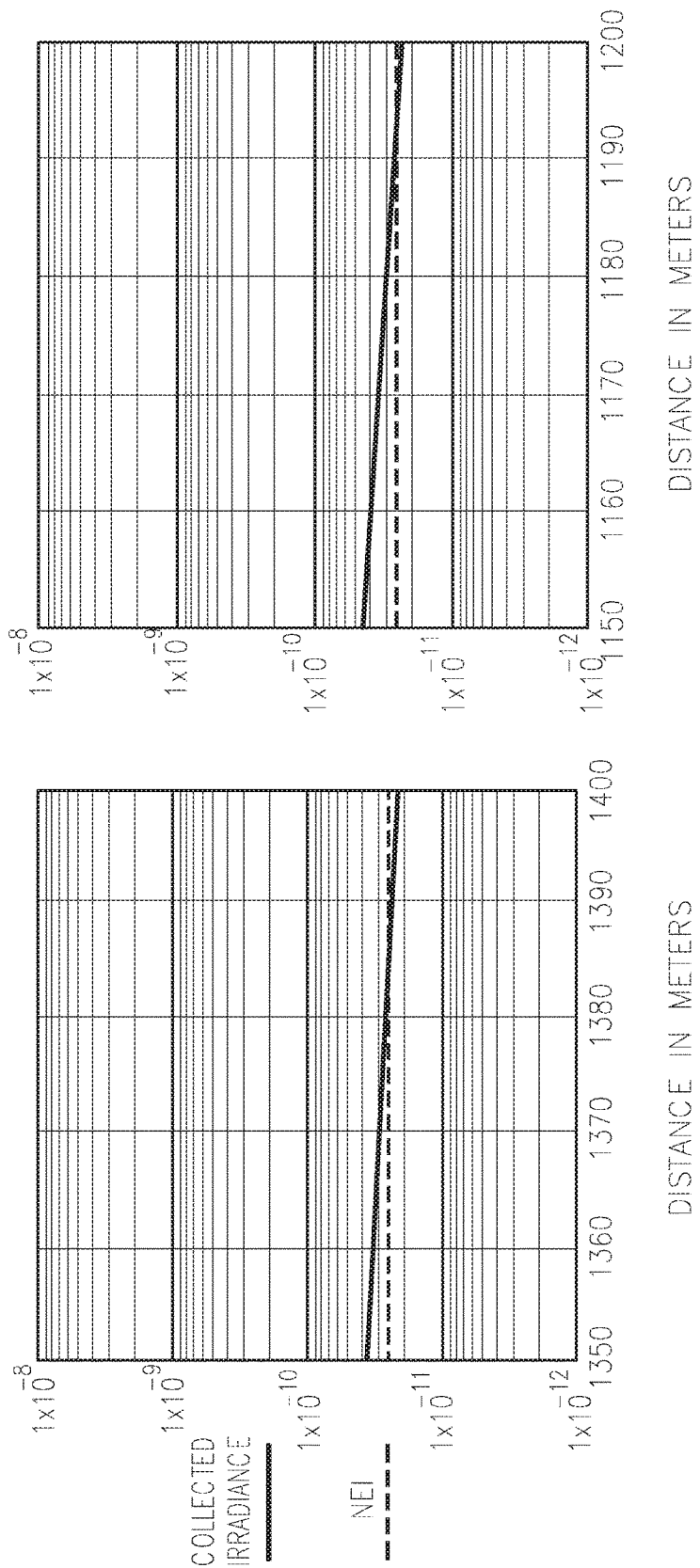

FIGS. 4A-4D present comparative simulation results between a prior art system (FIG. 4A) and infrared optical system 110 of the invention (FIGS. 4B-4D), according to some embodiments of the invention. The figures depict the collected irradiance from runway lights 90 and the noise equivalent irradiance (NEI) with respect to the distance from runway lights 90, as simulated under realistic assumptions concerning atmospheric radiation propagation. While prior art systems detect runway lights 90 at ca. 1110 m at most (FIG. 4A, intersection of collected bulb irradiance and NEI), system 110 detects runway lights 90 at ca. 1380 m (FIG. 4B, intersection of collected bulb irradiance and NEI), which corresponds to 2.5 RVRs. FIG. 4C is similar to FIG. 4B, and illustrates the system's detection range when the visibility range is 500 m (achieving 1380/500=2.76 RVR), while FIG. 4D illustrates the system's detection range when the visibility range is 423 m (achieving 1190/423=2.81 RVR).

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. An infrared optical system, comprising:
   an optics set consisting of four optical lenses, a Dewar's window and a detector's cold filter, which are designed to comply with an extended wavelength range extending beyond 1.2 μm toward shorter wavelengths and comprising a short-wavelength infrared (SWIR) range and at least one of: a middle-wavelength infrared (MWIR) range and a long-wavelength infrared (LWIR) range, to enhance a detection range of the infrared optical system,
   wherein the four optical lenses in the optics sent are positioned such that both the SWIR range and the at least one of the MWIR range and the LWIR range of infrared radiation pass through the four optical lenses; and
   a detector configured to detect radiation at the extended wavelength range passing through the four optical lenses,
   wherein the four optical lenses are aligned in an order of a first optical lens, a second optical lens, a third optical lens and a fourth optical lens along a direction along in which light comes into the infrared optical system vertically, wherein the first optical lens is made of arsenic triselenide, the second and fourth optical lenses are made of zinc sulfide, the third optical lens is made of lithium fluoride, and the Dewar's window and cold filter are made of sapphire.

2. The infrared optical system of claim 1, wherein the detector is arranged to detect radiation at the extended wavelength range.

3. The infrared optical system of claim 1, further configured to have a spectral range starting from 1 μm.

4. The infrared optical system of claim 1, wherein the detector is at a spectral band starting at 1 μm.

5. The infrared optical system of claim 1, wherein the detector is in a range comprising 1.0-2.3 μm.

6. The infrared optical system of claim 5, further arranged to detect in a range comprising at least one of 3-5 μm and 8-12 μm.

7. A method of increasing a detection range of an infrared optical system to an extended range, the method comprising broadening a spectral range of the infrared optical system to start from a specified wavelength that is shorter than a transmittance threshold of silicon while comprising a short-wavelength infrared (SWIR) range and at least one of: a middle-wavelength infrared (MWIR) range and a long-wavelength infrared (LWIR) range, by re-designing optics of the infrared optical system to consist of Dell a single set of four optical lenses, a Dewar's window and a detector's cold filter, designed to comply with an extended wavelength range extending beyond 1.2 μm toward shorter wavelengths and comprising the SWIR range and at least one of a MWIR range and a LWIR range, positioning the four optical lenses such that both the SWIR range and the at least one of the MWIR range and the LWIR range of infrared radiation pass through the four optical lenses; and detecting radiation in the extended wavelength range passing through the optical lenses, wherein the four optical lenses are aligned in an order of a first optical lens, a second optical lens, a third optical lens and a fourth optical lens along a direction in which light comes into the infrared optical system vertically, wherein the first optical lens is made of arsenic triselenide, the second and fourth optical lenses are made of zinc sulfide, the third optical lens is made of lithium fluoride, and the Dewar's window and cold filter are made of sapphire.

* * * * *